Aug. 20, 1957 A. J. MONTMINY 2,803,382
ATHLETIC FIELD MARKER
Filed Nov. 17, 1954 2 Sheets-Sheet 1
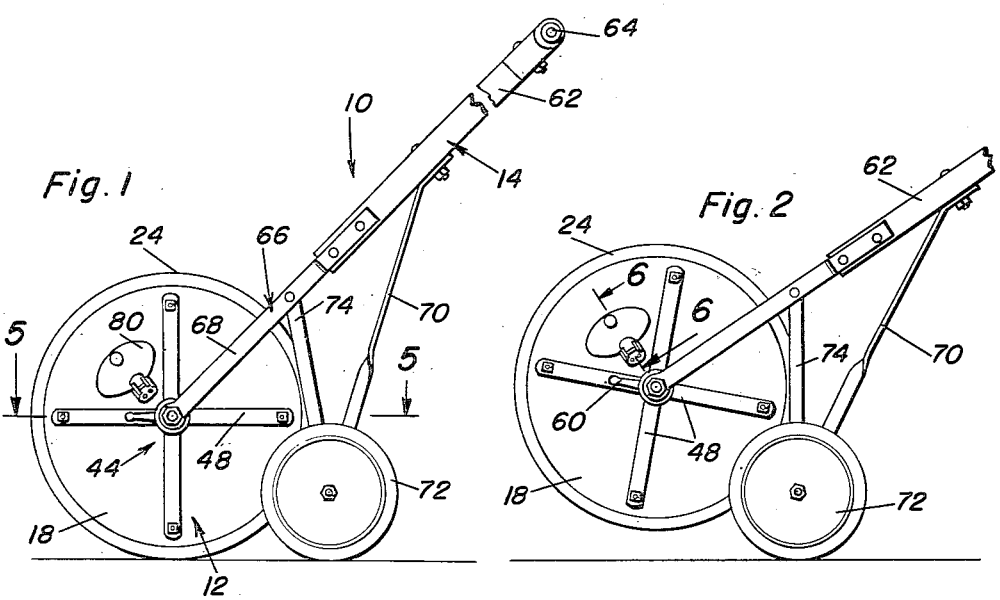
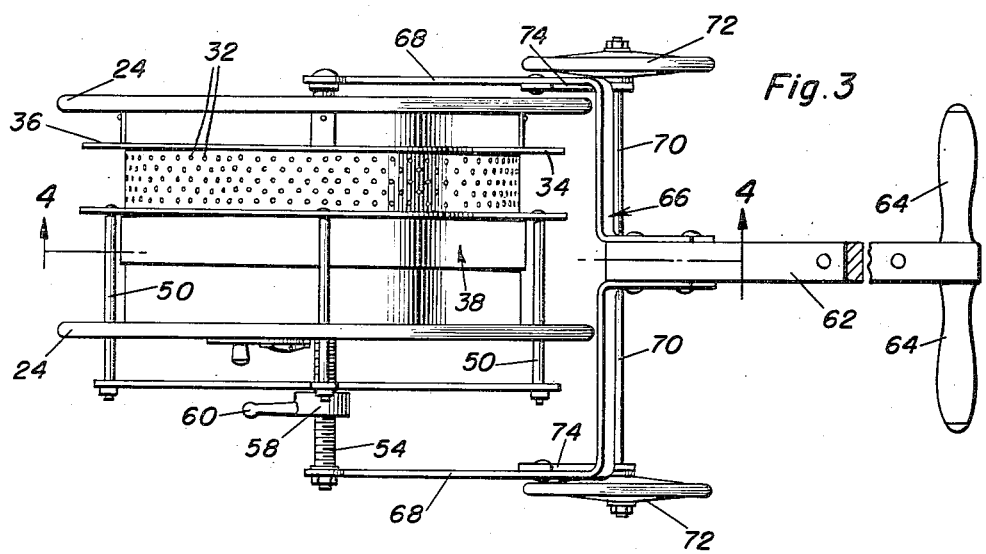
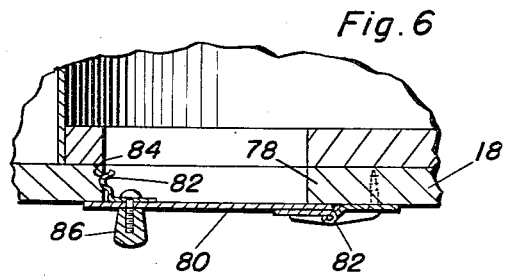
Alcide J. Montminy
INVENTOR.

Aug. 20, 1957     A. J. MONTMINY     2,803,382
ATHLETIC FIELD MARKER

Filed Nov. 17, 1954     2 Sheets-Sheet 2

Alcide J. Montminy
INVENTOR.

United States Patent Office 2,803,382
Patented Aug. 20, 1957

2,803,382
ATHLETIC FIELD MARKER
Alcide J. Montminy, Fall River, Mass.
Application November 17, 1954, Serial No. 469,445
5 Claims. (Cl. 222—171)

The present invention relates to an athletic field marker of the type comprising a drum for containing lime or other marking material, the drum having perforations in the cylindrical wall thereof for dispensing the material in the form of a visible line as the drum is rolled over a surface, this application being a continuation-in-part of my copending application, Serial No. 192,861, filed on October 30, 1950, now abandoned.

The primary object of the present invention is to provide an atheletic field marker of the drum type wherein the drum is equipped with means for adjustably controlling the width of a line to be laid by the drum as the drum is rolled over the surface.

A further object of the invention is in the provision of a novel assembly attached to the drum for varying the width of the line to be laid by the drum.

A further object of the invention is to provide an athletic field marker including a propelling handle for the drum, which propelling handle carries transversely spaced supporting wheels which are disposed to the rear of and on opposite sides of the drum whereby the marker may be raised from the ground and the apparatus rolled from place to place in a simple and convenient manner when it is not desired to lay an athletic field marking line or the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the athletic field marker constituting the present invention;

Figure 2 is a side elevational view similar to Figure 1 disclosing the apparatus with the marker in raised position for rolling the apparatus over a surface without marking the surface;

Figure 3 is a top view of the athletic field marker;

Figure 6 is an enlarged detail view in cross-section of the loading opening for filling and emptying the drum.

Figure 4:
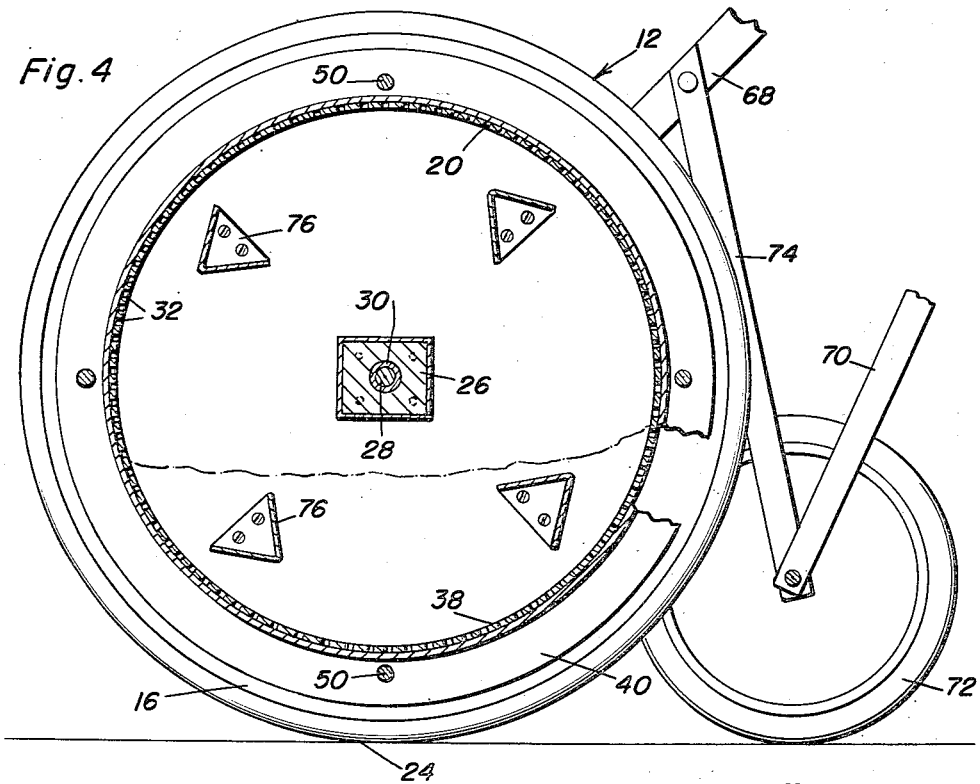
Figure 4 is a cross-sectional view taken substantially along the plane of section line 4—4 of Figure 3 through the field marking drum.

Referring now to the drawings in detail, the athletic field marker is designated in its entirety by the numeral 10 and comprises essentially a field marking drum 12 having a handle assembly 14 attached thereto for propelling the same over a surface.

The drum 12 is in the form of a pair of spaced, parallel disks 16 and 18, respectively, interconnected to one another by a cylindrical side wall 20, thereby forming a hollow housing.

The cylindrical wall 20 of the drum is of less diameter than the end walls 16 and 18 thereof, whereby the peripheries of the end walls 16 and 18 serve as tire rims, these peripheries being suitably grooved, as at 22, carrying solid tires 24.

The drum 12 is provided with an axial hub 26 extending therethrough, an axle or bearing shaft 28 being journaled within the hub and projecting beyond the end walls 16 and 18 of the drum. As will be noted in Figure 5, a suitable bushing 30 may be provided within the bore of the hub 26 with the axle 28 being journaled in this bushing.

The cylindrical wall 20 of the drum is provided with a circumferential zone of perforations 32 therearound, the perforations being arranged in spaced, circumferential rows.

Surrounding one end portion of the cylindrical wall 20 is a fixed collar or plurality of circumferentially spaced straps 34 carrying a radially outwardly extending annular flange 36 disposed adjacent one edge of the zone of perforations 32.

Slidably disposed on the opposite end portion of the cylindrical wall 20 of the drum 12 is a sliding sleeve or collar 38 having a radially outwardly projecting annular flange 40 on the edge thereof facing the annular flange 36 carried by the fixed collar or straps 34.

Means 42 is provided for adjustably sliding the sliding collar 38 along the cylindrical wall 20 to expose and close selected rows of apertures adjacent one edge of the zone of perforations 32 so that the width of a line laid by the drum as it moves along a surface may be varied to suit the particular conditions desired.

The means 42 for adjustably positioning the movable collar 38 comprises a spider 44 having a central hub 46 and radially outwardly extending arms 48, the radial extension of these arms being greater than the radius of the cylindrical wall 20 and less than the radius of the end wall 18. Rods 50 extend guidingly through apertures 52 in the end wall 18 in a direction parallel to the axle 28. These rods are spaced circumferentially around the end wall 18 and have their inner ends secured to the flange 40 of the movable collar 38 and their outer ends secured to the free ends of the spider arms 48.

The axle 28 has a threaded end portion 54 thereon projecting beyond the end wall 18 upon which end portion the hub 46 of the spider is loosely, slidably received. The end of the hub portion 46 is provided with an annular flange 56 and an actuating nut 58 has a portion thereof journaled on the hub 46 and held thereon by the flange 56. The bore of the nut is threadedly received on the threaded end portion 54 of the axle 28 and the nut is provided with a suitable lever 60 for turning the same whereby the spider 44 is moved toward and away from the drum 12 along the axle 28. Of course, as the spider moves, so moves the movable collar 38 to expose or cover selected rows of apertures 32 on the cylindrical wall 20 of the drum adjacent one edge of the zone of perforations.

The handle means 14 for rolling the drum 12 comprises essentially an elongated handle member 62 having suitable handle bars 64 at the upper end thereof. A yoke 66 is attached to the lower end of the handle and includes arms 68 straddling the drum 12 and journaled at their free ends on the projecting portions of the axle 28 of the drum 12.

Also suspended from the handle 62 adjacent the lower end thereof is downwardly depending leg 70 through the free end of which is journaled an axle 73, which axle has auxiliary supporting wheels 72 journaled on the ends thereof. Brace rods 74 are attached adjacent their opposite ends to the end portions of axle 73 and the drum carrying arms 68 of the yoke 66.

The auxiliary wheels 72 are disposed rearwardly of and beyond opposite ends of the drum 12 so that they may stabilize the rolling movement of the drum as the drum is rolled along a surface and additionally in themselves form a rolling support when it is desired to elevate the drum 12 from the surface as the drum is moved from place to place.

Such elevation, of course, causes the rotation of the drum 12 to cease which will, in effect, cause the lime within the drum to block the perforations 32 and prevent further flow of lime from the drum until rolling movement of the drum is again effected.

In order to keep the lime within the drum agitated and substantially free flowing so that the same will fall easily through the perforations 32 in the cylindrical wall 20 of the drum, within the interior thereof, the drum is provided with a plurality of circumferentially spaced triangular-shaped agitating blades 76, as will be clearly noted in Figure 4, which extend between the end walls 16 and 18 of the drum and which churn the lime within the drum as the drum is rolled along a surface in order to obviate caking of the lime and to maintain the lime in a substantially free flowing condition.

To fill the drum, the end wall 18 of the drum is provided with a suitable opening 78 which opens into the interior of the drum. Closure plate 80 hinged at one edge thereof, as at 82 in Figure 6, normally closes the filling opening 78, the edge of the closure plate 80 opposite the hinged edge thereof having a resilient keeper 82 projecting from the inner surface thereof adapted to frictionally seat in a groove 84 in the end wall 18. Handle 86 projecting from the outer surface of the closure plate 80 serves as the means for opening and closing the same.

Figure 5:
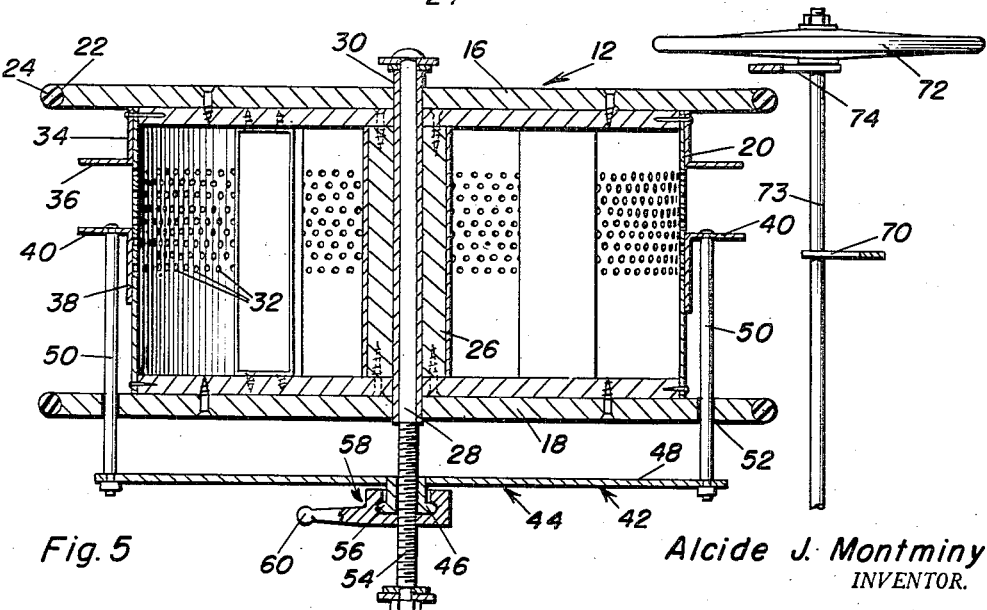
Figure 5 is a horizontal cross-sectional view through the field marking drum taken substantially along the plane of section line 5—5 of Figure 1.

As will be noted from an examination of Figures 3 and 5, the zone of perforations 32 on the drum is offset to one side of the propelling handle 62 whereby the operator may comfortably walk to one side of the line being laid by the marker.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and changes may be resorted to, falling within the scope of the appended claims.

What is claimed as new is as follows:

1. A field marking device comprising a hollow drum having disk-shaped end walls and a cylindrical side wall extending therebetween, said side wall having spaced rows of apertures therethrough extending circumferentially therearound, at least one collar surrounding said side wall, and means for adjustably positioning said collar to cover and expose selected rows of apertures whereby the width of a line laid by the drum may be varied, said drum having an axle journaled therethrough and projecting beyond the end walls thereof, said positioning means being movably mounted on one projecting end portion of said axle.

2. A field marking device comprising a hollow drum having disk-shaped end walls and a cylindrical side wall extending therebetween, said end walls being of greater diameter than said side wall and comprising rolling members for the drum, said side wall having spaced rows of apertures therethrough extending circumferentially therearound, at least one collar surrounding said side wall, and means for adjustably positioning said collar to cover and expose selected rows of apertures whereby the width of a line laid by the drum may be varied, said drum having an axle journaled therethrough and projecting beyond the end walls thereof, said positioning means being movably mounted on one projecting end portion of said axle, and comprising a spider having a central hub and arms radiating therefrom, rods attached to the free ends of said arms and said collar and extending guidingly through one of said end walls whereby movement of the spider on the axle moves the collar on the drum side wall.

3. A field marking device comprising a hollow drum having disk-shaped end walls and a cylindrical side wall extending therebetween, said end walls being of greater diameter than said side wall and comprising rolling members for the drum, said side wall having spaced rows of apertures therethrough extending circumferentially therearound, at least one collar surrounding said side wall, and means for adjustably positioning said collar to cover and expose selected rows of apertures whereby the width of a line laid by the drum may be varied, a handle for propelling said drum, said drum having an axle journaled therethrough attached to said handle, a pair of spaced supporting wheels carried by said handle, said drum being disposed forwardly of and between said wheels, said positioning means comprising a spider having a central hub and arms radiating therefrom, rods extending guidingly through one of said end walls at circumferentially spaced points therearound and being disposed parallel to said axle, the ends of said rods being attached to said collar and said spider arms, means adjustably mounting said spider on said axle.

4. A field marking device comprising a frame, a shaft carried by said frame, a hollow cylindrical drum mounted on said shaft, said drum having circumferentially extending, spaced rows of apertures therethrough intermediate the ends thereof, a sleeve in concentric relation with a portion of said drum, means carried by an end of said shaft and said sleeve for adjustably positioning said sleeve with respect to said drum to selectively cover and expose certain rows of said apertures whereby the width of a line laid by said drum may be varied.

5. A field marking device comprising a frame, a shaft carried by said frame, a hollow cylindrical drum mounted on said shaft, said drum having circumferentially extending, spaced rows of apertures therethrough intermediate the ends thereof, a sleeve in concentric relation with a portion of said drum, means carried by said shaft for adjustably positioning said sleeve with respect to said drum to selectively cover and expose certain rows of said apertures whereby the width of a line laid by said drum may be varied, annular guide flanges disposed at opposite side edges of the rows of apertures of said drum, one of said flanges being carried by said sleeve and having said means connected therewith.

References Cited in the file of this patent
UNITED STATES PATENTS

| | | |
|---|---|---|
| 370,593 | Allen | Sept. 27, 1887 |
| 986,018 | Libner | Mar. 7, 1911 |
| 1,055,347 | Mills | Mar. 11, 1913 |
| 1,651,271 | Hann | Nov. 29, 1927 |
| 1,792,441 | Palmer | Feb. 10, 1931 |
| 1,846,523 | LeRoy | Feb. 23, 1932 |